M. C. RYPINSKI.
MEASURING INSTRUMENT.
APPLICATION FILED NOV. 18, 1907.

985,457.

Patented Feb. 28, 1911.

WITNESSES:
C. L. Belcher
Otto S. Schairer

INVENTOR
Maurice C. Rypinski
BY
Wesley G. Carr
ATTORNEY

UNITED STATES PATENT OFFICE.

MAURICE C. RYPINSKI, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

MEASURING INSTRUMENT.

985,457.       Specification of Letters Patent.     Patented Feb. 28, 1911.

Application filed November 18, 1907. Serial No. 402,727.

*To all whom it may concern:*

Be it known that I, MAURICE C. RYPINSKI, a citizen of the United States, and a resident of Pittsburg, in the county of Allegheny and State of Pennsylvania, have invented a new and useful Improvement in Measuring Instruments, of which the following is a specification.

My invention relates to electrical measuring instruments, and it has for its object to provide an instrument the parts of which have such structure and arrangement that the insulation of the movable coil thereof may not be subjected to high-voltage strains and the manufacture of the instrument may be greatly facilitated and cheapened.

Figure 1:
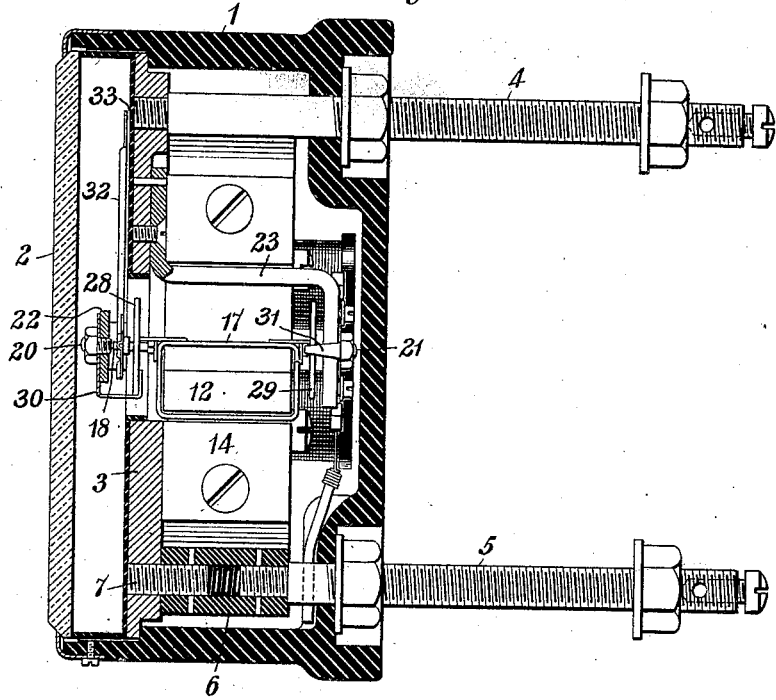
Figure 2:
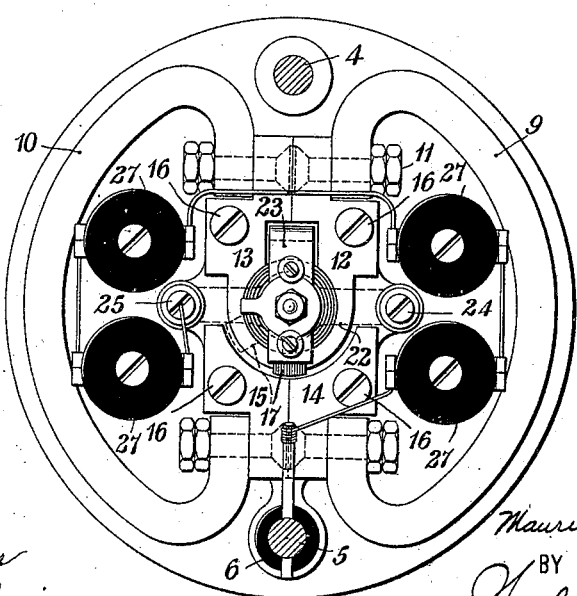

Figure 1, of the accompanying drawings, is a transverse sectional view of an instrument constructed in accordance with my invention, and Fig. 2 is a rear view of the instrument of Fig. 1, the casing being removed.

The operating parts of the instrument are inclosed within a casing 1 composed of suitable insulating material and provided with a glass front 2, and the said parts are supported by means of an annular metallic plate 3 that rests against a shoulder on the interior and near the front of the casing. The instrument is provided with supporting studs 4 and 5 that project into the casing, the inner end of the stud 4 being screwed into the plate 3 to assist in securing the said plate in position. An insulating bushing 6 is screw-threaded upon the inner end of the stud 5 and also upon one end of a short stud bolt 7, the other end of which is screwed into the plate 3.

The operating parts of the instrument comprise two permanent bar magnets 9 and 10 the main portions of which are substantially semi-circular and conform in shape to the interior of the casing, and the ends of which are bent inwardly at nearly diametrically opposite points.

Independently secured, by means of bolts 11, to one pair of the adjacent inwardly turned ends of the respective magnets 9 and 10, are two pole pieces 12 and 13 having substantially semi-circular extremities, the said pole pieces being placed together to form an annular ring-shaped polar extremity common to both magnets. Similarly secured to the other pair of inwardly turned ends of the permanent magnets are two concave pole pieces 14 and 15 that partially embrace the semi-circular portions of the pole pieces 12 and 13 but are separated therefrom to form an air gap.

The magnets are secured to the plate 3 by means of tap bolts 16 passing through the polar projections in such a manner that each magnet may be inserted into and removed from the instrument independently of the other.

Threaded upon the ring-shaped pole provided by the pole pieces 12 and 13 is a coil 17 one side of which is movable in the air gap between the pole pieces 12 and 13 and the pole pieces 14 and 15, the said coil being mounted upon pivot-pins 18 and 19 for which bearings are provided in screws 20 and 21 that are threaded in brackets 22 and 23, respectively. The bracket 23 extends from the back of the casing to the plate 3 in the front thereof, to which it is secured and electrically connected, and the bracket 22 spans the central opening in the plate 3 and is secured to said plate by means of suitably insulated bolts 24 and 25. The bolt 25 is electrically connected at its rear end to one terminal of a series of resistance coils 27 that are included in the circuit when the instrument is adapted to operate as a voltmeter, it being understood that if the instrument is intended for operation as an ammeter, the resistance coils will, in most cases, be omitted from the circuit.

Current is conducted to and from the movable coil 17 by means of spiral springs 28 and 29 against the torsion of which the movable coil is operated by the actuating forces in the instrument, the inner ends of the springs being mechanically secured to the said coil and electrically connected respectively to its terminals, and the outer ends thereof being secured respectively to arms 30 and 31 carried by and electrically connected to the brackets 22 and 23.

The movable element of the instrument carries a pointer 32 that moves adjacent to a graduated scale 33. The movable coil 17 normally occupies the position indicated in broken lines in Fig. 1, and is moved from right to left a distance proportional to the amount of current traversing the said coil, according to well-understood principles.

Current traverses the instrument by way of the stud 4, the plate 3, the bracket 23, arm 31, spiral spring 29, coil 17, spiral spring 28, arm 30, bracket 22, resistance coils 27 and terminal stud 5.

Since all of the parts of the instrument except the bracket 22, the resistance coils 27 and the stud 5 are electrically connected to the plate 3, the maximum difference of potential between the coil 17 and adjacent parts is equal only to the drop of potential over the said coil, which is very small, and it will, therefore, be understood that there is but slight strain upon the insulation of the coil. Furthermore, since the instrument casing is composed of insulating material, the live parts of the instrument are thoroughly protected and all danger of accidental burning out of the movable coil is, therefore, obviated.

The parts of the instrument which require accurate adjustment of position, with respect to each other, are the magnet system and the brackets 22 and 23 that are provided with the bearings for the movable coil, and the said parts are all independently secured to and are alined from the plate 3. In assembling the instrument, therefore, after the parts have been carefully finished, it is only necessary to secure them, one at a time, to the said plate without the use of jigs or other similar devices, and the parts will be accurately disposed with reference to each other, the manufacture of the instrument being thereby greatly facilitated and cheapened.

I claim as my invention:

1. An electrical measuring instrument comprising an insulating casing, supporting studs that project into the casing and serve as circuit terminals for the instrument, and a conducting front plate which supports the operating parts of the instrument, said plate being secured to the said studs within the casing but being electrically connected to only one of them.

2. An electrical measuring instrument comprising an insulating casing, a magnet system, a coil, brackets provided with bearings for the movable coil, a front plate within the casing to which the magnet system and the brackets are secured, and supporting studs for the instrument that project through the back of the casing to serve as circuit terminals for the instrument and as supports for the front plate.

3. An electrical measuring instrument comprising an insulating casing, studs that project into the casing and serve as terminals and as supporting means for the instrument, a conducting plate within the casing secured to said studs but electrically connected to only one of them, brackets carried by the said plate, one of which is insulated therefrom but is connected to the stud that is also insulated therefrom, and a movable coil electrically connected between the brackets and supported upon bearings therein.

In testimony whereof, I have hereunto subscribed my name this 7th day of November, 1907.

MAURICE C. RYPINSKI.

Witnesses:
WM. BRADSHAW,
BIRNEY HINES.